(12) United States Patent
Billman

(10) Patent No.: US 11,217,113 B2
(45) Date of Patent: Jan. 4, 2022

(54) METHOD FOR NOTATING THE LOCATIONS OF THE VARIOUS PITCHES OF STRINGED INSTRUMENTS

(71) Applicant: Tyler Robert Billman, Raleigh, NC (US)

(72) Inventor: Tyler Robert Billman, Raleigh, NC (US)

(73) Assignee: Tyler Robert Billman, Fayetteville, NC (US)

( * ) Notice: Subject to any disclaimer, the term of this patent is extended or adjusted under 35 U.S.C. 154(b) by 0 days.

(21) Appl. No.: 16/389,933

(22) Filed: Sep. 13, 2019

(65) Prior Publication Data

US 2021/0082303 A1 Mar. 18, 2021

(51) Int. Cl.
*G09B 15/02* (2006.01)
*G09B 15/00* (2006.01)

(52) U.S. Cl.
CPC .......... *G09B 15/02* (2013.01); *G09B 15/00* (2013.01)

(58) Field of Classification Search
CPC ....... G09B 15/02; G09B 15/023; G09B 15/00
See application file for complete search history.

(56) References Cited

U.S. PATENT DOCUMENTS 438,429 A * 10/1890 Clemens ............. G09B 15/02
84/483.2
6,414,231 B1 * 7/2002 Miyamoto ............. G09B 15/00
84/477 R

FOREIGN PATENT DOCUMENTS

WO WO-2011063442 A1 * 6/2011 ............. G09B 15/02

* cited by examiner

*Primary Examiner* — Daniel J Colilla

(57) ABSTRACT

A method of explicit note-location for stringed instruments synthesizing tablature notation and traditional classical staff notation for more fluid sight-reading of musical pieces. The invention makes explicit the note-locations-on-stringed-instruments of notated pitches. The method including the steps of marking a musical note or musical notes representing a particular pitch on the five-lined music staff or other form of graphic music notation system being used for said stringed instrument, marking a first numerical indicator on the musical note that indicates the location, along a string, on the stringed instrument, at which the at least one musical note is intended to be sounded from, and marking a second numerical indicator on the at least one musical note, appended to the first numerical indicator, that indicates which specific string of the stringed instrument on which the at least one musical note is intended to be sounded. Each first and second numerical indicator being marked together as a single, composite numerical indicator upon said musical note.

5 Claims, 2 Drawing Sheets

METHOD FOR NOTATING THE LOCATIONS OF THE VARIOUS PITCHES OF STRINGED INSTRUMENTS

FIELD OF THE INVENTION

The invention is related to the fields of musical notation, including methods for notating specific types of musical information, informing techniques in the fields tangent, including the fields of printmaking, design, musical scoring, digital displays, etc. The invention therefore is also related to the field of methods for musical education.

BACKGROUND OF THE INVENTION

The classical musical staff, being the foundational music notation system of popular musical practice across the globe, is the base from which the background of the disclosed invention stems. Because the invention only serves to notate pitch-location-on-stringed instruments, and not any other form of musical expression such as dynamics, expressions, accents, or the like, these types of indicators (though crucial to the classical staff notation method in and of itself) will not be discussed.

The staff itself was developed and refined over a period of hundreds of years, arguably beginning around the 1400s. During this time, monks began notating the songs they sang together, commonly referred to as "plainchant," and from this practice the musical staff was developed, including the specific use of a five-line/four-space stave-system, noteheads of varying shapes, sizes, etc., barlines, etc. As the music of stringed instruments was developed following keyboard, vocal, and other instrumental musics, a problem arose. This problem is one that is specifically and wholly solved by the disclosed invention: the pitches possible to sound on a stringed instrument may be sounded via multiple unique locations on a stringed instrument, whereas for instruments such as piano or voice, the same is not true. Due to this feature of stringed instruments, alternative methods for indicating which pitches to sound have been developed. Tablature was the first such method to be developed, the initial development of tablature for stringed instruments occurring around the 1400s and 1500s. Tablature utilizes a system of parallel lines representing the individual strings of an instrument and, most commonly, either numbers or letters to represent the individual locations along strings at which varying pitches may be sounded. This system allows for each unique location of any given pitch to be notated explicitly, unlike the classical musical staff which alone provides no method for the same.

Today, there are three notation methods commonly in use in music education, practice, and performance that contain features similar in appearance to the disclosed invention, but after examination clearly comprise differing functions, those functions furthermore pointing towards fields into which future inventions may develop, but which the disclosed invention does not do so. Rather, the disclosed invention branches into a new area that differs from what is common and standard for today's music notation practices. These three notation methods are: classical fingering notation, the method of printing the classical musical staff in parallel/combination with a corresponding stave-system of tablature, and the method utilized in the Hal Leonard series "EZ-Play Today™", wherein the pitch letter-names are graphically superimposed over the noteheads of the classical musical staff system of notation.

Having described the two major and fundamental music notation methods (classical staff and tablature, the classical musical staff system and tablature systems, these three, aforementioned and commonly used notation methods for stringed instruments may now be adequately analyzed for problems solved by the disclosed invention.

First, the classical fingering method of notation for stringed instruments may be examined. This method utilizes a system of numbers graphically arranged in the spaces around the noteheads of the classical musical staff to provide stringed instrumentalists with information that, at first seems to explicitly notate pitch-location-on-the-instrument, but after examination may more accurately be said to imply such pitch locations. The classical fingering system has three specific numerical indicators that are relevant for examination; a position indicator, indicating what location to rest one's hand at, and at what location to inferentially "read" the following two indicators in: the string-stopping, hand-fingering indicators, being the numbers one through four and sometimes the letter "T", these indicators notating which finger to use to stop which string in order to sound which pitch, T indicating the use of one's thumb, one indicating the use of one's pointer finger, two indicating the use of one's middle finger, three the use of the ring finger, and four the use of the little finger: and finally, the string indicator, being numerals corresponding to each string on the instrument, being placed under the respective noteheads and the staff to indicate what string, upon which what finger rests to stop said string, in which position, in order to sound the pitch indicated by the respective notehead that is notated upon the classical staff. Of most significance to note for the purposes of this disclosure is the fact that there are only two "position" or "location" indicating numerals active in the classical fingering notation method: the position and string numerals. In order to effectively utilize this method, one must necessarily infer which exact fret/location each pitch is to be sounded at/from (possible to be explicitly notated by use of a representative number, as demonstrated by the development and continued use of tablature notation). It can be shown then, that only one experienced in the use of this method may accurately and quickly infer where exactly to place which finger in which position on which string in order to sound the indicated pitch. In other words, just knowing where to rest their hand (by position marking), and what string (string indicator) to place which finger on (fingering indicator), does not lead one directly or immediately to placing this finger at the correct fret. A person having ordinary skill in the art should be able to understand this well enough to continue from this conclusion onward to others, this grey-area of inference and implicit notation comprising a significant problem for beginners and learners that must be overcome through diligent practice and study, such effort being assuaged and such problems in classical fingering notation being made null by the disclosed invention.

A single glance at the placement onto the musical staff of the additional indicators comprising the classical fingering notation method produces implications about the direction and area for further development of similar methods. That direction/area is the whitespace around the noteheads of the musical staff, and the whitespace below and above the lines of the staff. In short, we see that developments adapting the classical musical staff for better use with stringed instruments are so far embodied in indicators around the noteheads and outside of, above and below, the musical staff itself—not within the space of the noteheads themselves.

This is important to note, as this feature of classical fingering notation differs significantly from the disclosed methods of the invention.

Second, tablature as a notation method for stringed instruments is highly deficient, though in ways differing from the classical musical staff, and from the classical fingering notation methods. Tablature is a method wherein what strings on which pitches are to be sounded, and what location along those strings is to be stopped in order to produce what pitches are to be sounded are notated explicitly. Numerals, representing pitches to be sounded correspond with the particular locations along the strings on which those pitches are to be sounded, the strings themselves indicated by representative graphics: sets of strings represented by sets of parallel, horizontal lines. Tablature presents a system of lines and spaces like the staff, except that the spaces hold no meaning and the lines themselves represent the physical strings, these lines being what the aforementioned numerals are placed on, this comprising the method by which tablature accomplishes explicit notation of pitch location. However, tablature critically lacks what is present in the classical staff notation method, namely, the explicit notation of pitch letter name. Only one skilled as a stringed instrumentalist may correctly and quickly infer the pitch-letter-names of the indicated notes-at-what-positions-along-what-strings, and only after extensive practice and study. Being able to see and read the pitch-letter-names like in classical musical staff notation is critical for realizing and understanding fundamental musical relationships between intervals, etc. Tablature only allows for this through the aforedescribed work of study and inference. The most common means of supplementing this musical-informational deficiency of tablature is to print both a system of the classical musical staff, and the identical/corresponding expression, in tablature, of that system, directly below it, so that one may read a classical musical staff in parallel with a tablature staff (see FIG. 2). This state-of-the-art practice suggests a trend in the observations of what direction/area for development are suggested by an analysis of classical fingering notation: developments in the explicit notation of the location of pitches to be sounded by stringed instruments are to be made in the whitespace areas around the classical musical staff, and not within the noteheads of it. This compounds the conclusion of the analysis of classical fingering notation, again differentiating the disclosed invention from the state of the art.

The third, relevant, state-of-the-art notation method, examples of which may be seen in the Hal Leonard book series, "EZ-Play Today™", and other in-print music books, is simply a method of supplementing the classical musical staff by graphically superimposing the pitch letter-names over/on-top of the corresponding noteheads. This method is meant to assist beginning musicians in learning to read the classical musical staff itself, eliminating the step of memorizing which lines and spaces correspond to which pitches with which pitch letter-names. However, in the context of the herein disclosed invention, this method of graphically superimposing pitch letter-names over the noteheads of the musical staff provide little benefit for stringed instrumentalists, given that pitch letter-names communicate no information about where on the stringed instrument a note needs to be, or may be performed, which for a given pitch may be, in some cases, upwards of six different locations. In other words, instructing one to perform the musical pitch "E" does not narrow the manifold possibilities for doing so on stringed instruments to a single option, as can be seen by example in FIG. 2. It may then be concluded that, although the method of graphic superimposition seems to suggest that developments in the state-of-the-art may occur in this area, this particular method does not lead one towards the disclosed invention, as, for stringed instruments, pitch letter-name and the location of areas that are used to sound pitches are almost never analogous, and are in fact two different types of musical informations.

In light of these state-of-the-art methods, I herein describe a novel music notation method to be utilized in the aid of stringed instrumentalists performing music on instruments of like, kind, and family to guitar, violin, bass, banjo, sitar, koto, lap-steel guitar, etc., especially in the aid of beginning and learning stringed instrumentalists, this notation method solving for the information deficiencies and inefficiencies described above, by branching anew the fields related to tablature, staff, and fingering notation.

BRIEF SUMMARY OF THE INVENTION

The invention disclosed herein is a musical notation method for representing the relationship between pitches notated on the traditional classical musical staff and the location of those notes on any stringed instrument (especially those built for the modern system of harmony utilizing 12 notes, or divisions within a musical octave), effectively accounting for problems encountered by string musicians when reading either staff notation, or tablature notation, or both in combination. The method provides for a method of producing numerical indicators which refer to each specific and unique location on a stringed instrument at which a pitch may be sounded, and provides for utilizing these indicators to support the reading of music on the classical staff, by graphically superimposing the numerical indicators to the appropriate, respective, and correctly corresponding note-heads of the musical staff. Methods of use and preferred embodiments are also included/contemplated.

DETAILED DESCRIPTION

State of the art musical notation methods mostly fail to provide stringed instrumentalists with a simple, easy-to-understand, and easy-to-read method for indicating where on a given stringed instrument one must sound pitches, while also showing other musical informations such as interval relationships, etc. The single method that provides this specific musical information, the combination of the staff and tablature, does so in a way that makes reading and absorbing all of the presented information simultaneously very difficult, which is necessary for musical practice, and especially performance. Additionally, the combination of the staff and tablature uses large amounts of white-space on paper and in display, making printing and digital display inefficient.

Figure 1:
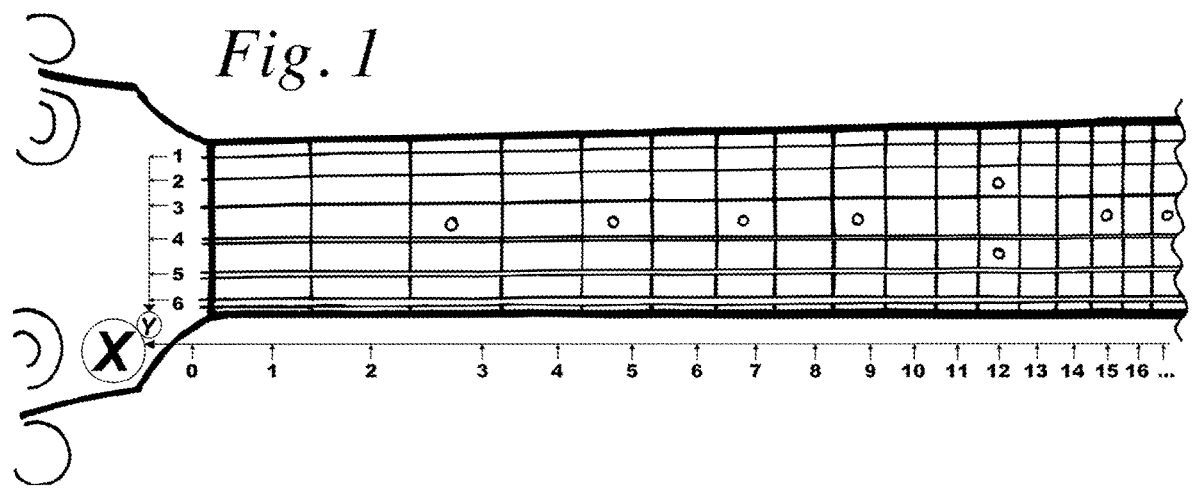
FIG. 1: A view of a guitar neck and fretboard, with numerals indicating string numbers and fret numbers, and indicating how those numbers are brought together to form the indicator forming a part of the invention disclosed.
Figure 3:
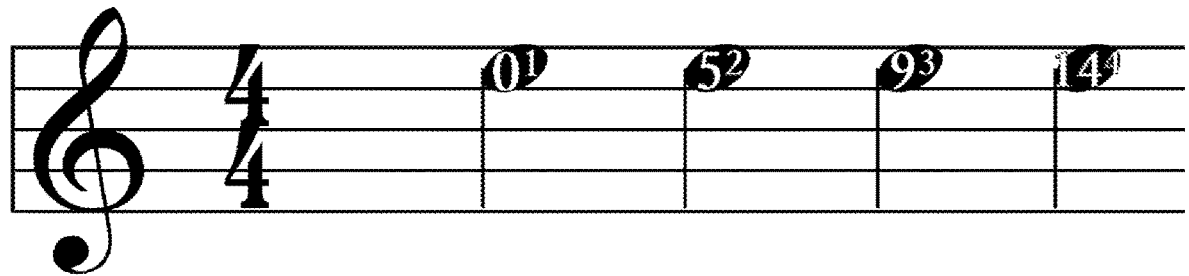
FIG. 3: A simple example of the musical information in "FIG. 2", notated utilizing the methods comprising the disclosed invention, from which a person having ordinary skill in the art should be able to construe further uses and applications.

The disclosed invention specifically addresses these issues by: creating a system in which every single location on a stringed instrument of every single pitch is assigned a completely unique numerical indicator, thereby differentiating potential places at which the same pitch may be sounded, as shown in FIG. 1 and FIG. 3. Then, the graphic superimposition of these numerical indicators onto/over the noteheads of the musical staff, also illustrated by FIG. 3, solves for the inefficiencies of printing tablature and staff music in parallel. Additionally, this graphic superimposition essentially compresses the information displayed by combination tablature-classical-staff systems completely into the staff itself, making it possible to read much more information simultaneously, and more easily, the field of one's visual focus being physically more compact.

The disclosed notation method is composed of a system of numerical indicators derived from universal characteristics of stringed instruments like to the guitar, violin, mandolin, banjo, sitar, koto, lap steel guitar, and other such instruments.

As pictured in FIG. 1, the format of this system of indicators is as follows: a composite numerical indicator composed of two numerical characters. The first numerical character, shown by the baseline "X", represents any pitch location across a string—in the example pictured in FIG. 1, these are the numbered frets of a guitar. The second numerical character, shown by the superscript "Y", represents any string location—in FIG. 1, these are the strings of a guitar. These two numbering systems are then composed in the format pictured in FIG. 1 (XY). This method of composing numerical indicators results in a set of individually unique numerical indicators, each of which may be read to lead a string instrumentalist's fingers to a single, explicitly notated pitch-location on any given string instrument. This composite indicator is then graphically superimposed on top of the corresponding note-heads of each pitch to be sounded in a musical piece, this being the general method for the application of the disclosed invention, or notation method.

Figure 2:
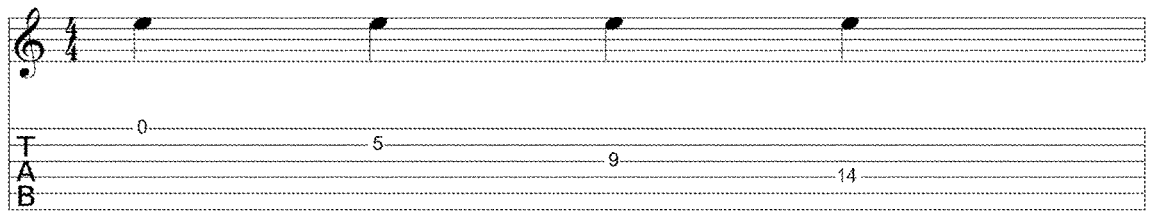
FIG. 2: An example of common formatting/use of the combination of the classical musical staff and tablature in parallel, being a reference to the prior art, included for reference purposes only, also showing that the same note as notated on the classical musical staff has many potential areas for sounding, as is shown by the corresponding tablature.

FIG. 3 shows an example of this method in use, solving the problems with traditional classical staff notation and tablature notation described in the "BACKGROUND OF THE INVENTION" section of this disclosure. For each location on a guitar where the same pitch—in FIG. 3, the pitch "E4"—may be sounded, there is a corresponding indicator graphically superimposed on top of the note-head of the "E4" notated on the musical staff, according to the method of this disclosure. As can be seen by comparing the prior art in FIG. 2 to the example of the herein disclosed invention in FIG. 3, the invented notation is much more spatially efficient (utilizing the basic resource of page-space/ paper more efficiently), and much less visually overwhelming, taking a field of information from a person's peripheral vision and bringing that information fully into a sight-reader's central vision. In practice, this requires much less eye-movement in the process of reading musics notated with the disclosed invention, while also communicating all the musical information necessary for string instrumentalists to perform their musics.

Those skilled in the art of graphics design and making, especially music notation experts, but also those in fields of printmaking and the like, should be adequately enabled by the herein disclosed description to form the invention into the varying preferred embodiments herein described. It would be preferable that a person seeking to make the same as is described is both a skilled stringed instrumentalist, being able to accurately pair the indicators to the correct noteheads, and a somewhat skilled graphic designer/image manipulator/musical scoring and writing practitioner.

The best form this invention may take is that shown in the drawings, especially FIG. 3, wherein the invented indicator is graphically superimposed over the correctly corresponding noteheads of the classical musical staff. This same form may occur in/on other graphic musical notation methods similar to the classical musical staff, being too many and variable to list here, but which typically include varying amounts of lines and/or spaces in systems, varying notehead, stem, and flag systems, sometimes colorized indication methods, and sometimes grid/graphing systems, and other methods for conveying the same musical information as is conveyed by the classical musical staff notation method. This should be considered to include notation methods less widely known, especially those of traditional, historical, ancient, or otherwise socio-geographically isolated natures. In other words, the graphic superimposition of the invented indicators onto any musical notation for the purpose of explicitly enabling the notation of pitch location on stringed instruments as described earlier is the ideal form this invention may take. Less ideal, but still useful forms would include short-hand expressions of the invented notation method, essentially looking like so: $1^1 1^2 2^3 3^4 3^5 1^6$, $3^1 3^2$, etc. . . . where each set of indicators grouped together and separated by commas indicate the locations of pitches to be sounded.

As mentioned in the description of the invention, it is actualized in concrete forms via graphic superimposition. Given that the current state of the art in musical scoring is largely sequestered into the field of use of highly specialized computer programs, it seems implicit that the best mode for carrying out the invention would be found in a specialized computer program, one that is capable of smoothly and easily producing, digitally, the types of graphics disclosed herein which comprise, in part, the disclosed invention. Ideally, this program could both be used to draft new documents utilizing the disclosed notation method, as well as scan pre-existing documents of manifold form and file-type to then convert those pre-existing documents such that they align with the disclosed, invented notation method. Alternatively, graphics creation programs currently in use and circulation would serve well to carry out the invention, the images and musical documents then created being distributed, printed and/or displayed via conventional means. Additionally, it is not unreasonable to imagine that there are those interested in, capable of, and willing to manually produce embodiments by hand-writing and/or drawing.

The preferred embodiments, actualized via the previously described best modes for carrying out the invention, include, but are not limited to, forms of various printed materials, such as books, pamphlets, posters, cheat-sheets, musical scores, etc., related printed forms such as stickers, flash-cards, stamping-sets, musical guides, etc., and forms found in the many digital graphics fields, as in computer programs, Internet applications, so-called smartphone apps, digital documents, videos, and eBooks, and the various forms of media finding use in Virtual and Augmented Reality environments. Beyond these, one might imagine holographic embodiments or embodiments expressed in the burgeoning field of computer-brain/computer-human/computer-body interfacing systems. According to the current disclosure and the descriptions and drawings herein, those skilled in the fields to which the aforementioned preferred embodiments are relevant should be able to envision and carry-out the invention as described, without undue and extensive experimentation.

The composite indicator formed by the first numerical indicator and the second numerical indicator is termed a "fring" indicator (this word is a portmanteau of the words "fret" and "string").

The invention claimed is:

1. A method of visually representing music notation for a stringed instrument whereon one or more strings are plucked, picked, bowed, or otherwise activated by one hand, or both, and whereon said one or more strings are depressed or otherwise manipulated by another hand, or both, in order to change which pitches are sounded, wherein said stringed instrument is of construction and use such as that of guitar, bass, banjo, violin, lap-steel guitar, or sitar, wherein musical pitches are represented via a numbering method, comprising the steps of:

providing a conventional, five-lined music staff, or other form of graphic music notation in which pitch and duration of pitch are represented symbolically;

marking at least one musical note representing a particular pitch on the five-lined music staff, or the other form of graphic music notation being used for said stringed instrument;

marking a first numerical indicator on the at least one musical note wherein the first numerical indicator indicates the location, along a selected one of the one or more strings, on the stringed instrument, at which the at least one musical note is intended to be sounded from;

marking a second numerical indicator on the at least one musical note, appended to the first numerical indicator, wherein the second numerical indicator indicates which specific string of the one or more strings, of the stringed instrument, on which the at least one musical note is intended to be sounded;

each first and second numerical indicator being marked together as a single, composite numerical indicator upon said at least one musical note.

2. The method of claim 1, wherein the first numerical indicator is a whole number and the second numerical indicator is a whole number, the first numerical indicator and the second numerical indicator being arranged consecutively, and the second numerical indicator being formatted as a superscript digit, forming a composite indicator being termed a "fring" indicator (this word is a portmanteau of the words "fret" and "string").

3. The method of claim 1, wherein the first numerical indicator is a whole number corresponding with each pitch possible to be sounded along said selected one of said one or more strings of said stringed instrument, the lowest pitch possible to be sounded along said selected one of said one or more strings corresponding with a "0,"

wherein with each consecutive, adjacent pitch in rising frequency, according to proper musical practice and conventions appropriate to said stringed instrument, along said selected one of said one or more strings, the first numerical indicator increases by a consecutive whole number, and wherein the second numerical indicator is a whole number corresponding with said selected one of said one or more strings of said stringed instrument, wherein the whole number of the second numerical indicator always begins with "1," to correspond with a first string of said one or more strings of said stringed instrument, according to proper musical practice and conventions appropriate to said stringed instrument, and wherein said second numerical indicator increases by a consecutive rising whole number to represent a next consecutive string of the one or more strings on the stringed instrument, according to proper musical practice and conventions appropriate to said stringed instrument.

4. The method of claim 1, wherein the first numerical indicator and the second numerical indicator are formed by superimposing the first and second numerical indicators onto a head of the at least one musical note located on the music staff, or onto graphic notational shapes of said other form of graphic music notation.

5. The method of claim 1, wherein each composite indicator is configured to represent each particular, unique location on said stringed instrument at which a pitch may be sounded by selection of the first numerical indicator and the second numerical indicator, such that any single pitch possible to be sounded on said stringed instrument, which may be sounded at multiple locations on said stringed instrument, is assigned a unique composite indicator for each unique pitch location, independent of pitch frequency, and such that any pitch with a single possible location for sounding on said stringed instrument is also assigned a completely unique composite indicator.

* * * * *